US010109306B2

(12) United States Patent
Furuta et al.

(10) Patent No.: US 10,109,306 B2
(45) Date of Patent: Oct. 23, 2018

(54) METHOD OF CORRECTING HEAD SUSPENSION, METHOD OF MANUFACTURING HEAD SUSPENSION, HEAD SUSPENSION AND METHOD OF PROCESSING THIN PLATE

(75) Inventors: Eijiro Furuta, Aikoh-gun (JP); Isamu Ninomiya, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 788 days.

(21) Appl. No.: 12/321,565

(22) Filed: Jan. 22, 2009

(65) Prior Publication Data

US 2010/0033874 A1 Feb. 11, 2010

(30) Foreign Application Priority Data

Jan. 22, 2008 (JP) ................................. 2008-011998

(51) Int. Cl.
*G11B 5/48* (2006.01)

(52) U.S. Cl.
CPC .................................. *G11B 5/4833* (2013.01)

(58) Field of Classification Search
CPC ... G11B 5/4833; G11B 5/4813; G11B 5/4806; G11B 5/48; G11B 5/4826; G11B 5/54; G11B 5/56; B21D 11/20; B23K 26/073; B23K 26/0736; B23K 26/0734
USPC ............ 219/121.69, 121.76, 121.79, 121.78, 219/121.8; 360/244, 244.9; 392/315, 392/342, 386, 399, 500, 321, 323, 324
See application file for complete search history.

(56) References Cited

U.S. PATENT DOCUMENTS

| 6,073,337 A * | 6/2000 | Strom .................. G11B 5/4826 |
| | | 29/603.12 |
| 6,548,009 B1 * | 4/2003 | Khlif et al. .................... 264/400 |
| 6,635,850 B2 * | 10/2003 | Amako et al. ........... 219/121.76 |
| 2003/0019095 A1 * | 1/2003 | Chang ...................... B21D 1/00 |
| | | 29/603.09 |
| 2003/0142323 A1 * | 7/2003 | Tokura .......................... 356/601 |
| 2004/0001288 A1 * | 1/2004 | Yao ........................ G11B 5/486 |
| | | 360/294.3 |
| 2004/0037011 A1 * | 2/2004 | Inoue et al. .................... 360/313 |
| 2006/0053621 A1 * | 3/2006 | Ichimura et al. ........... 29/603.03 |
| 2006/0207975 A1 * | 9/2006 | Ehrmann et al. ......... 219/121.68 |
| 2007/0047148 A1 * | 3/2007 | Okawara ..................... 360/245.5 |
| 2007/0080148 A1 * | 4/2007 | Hirano et al. ............ 219/121.85 |

FOREIGN PATENT DOCUMENTS

| JP | 2-252179 | 10/1990 |
| JP | 2000-339894 | 12/2000 |
| JP | 2002-093092 | 3/2002 |

(Continued)

*Primary Examiner* — Tu B Hoang
*Assistant Examiner* — Diallo I Duniver
(74) *Attorney, Agent, or Firm* — Norris McLaughlin, P.A.

(57) ABSTRACT

A method corrects a head suspension by irradiating an objective part of the head suspension with a laser beam before or after mounting a read/write head on the head suspension. The method can precisely correct the head suspension even when correcting the head suspension a plurality of times. The method includes drawing, with the laser beam, a straight line of predetermined length on the objective part and repeating this process a plurality of times in such a way that the direction of a straight line drawn this time crosses the direction of a straight line drawn last time.

11 Claims, 13 Drawing Sheets

(56) References Cited

FOREIGN PATENT DOCUMENTS

| | | |
|---|---|---|
| JP | 2004-82161 | 3/2004 |
| JP | 2006-269018 | 10/2006 |
| JP | 2007-051710 | 3/2007 |

* cited by examiner

Fig.7
Printing example C1
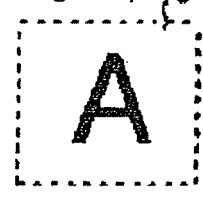
① C2 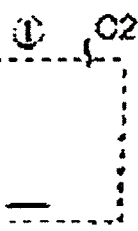
② C3 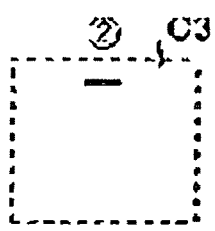
③ C4 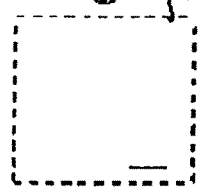
④ C5 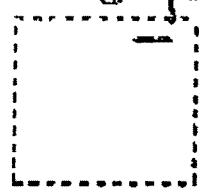
⑤ C6 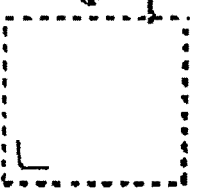
⑥ C7 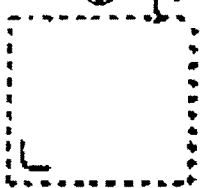
⑦ C8 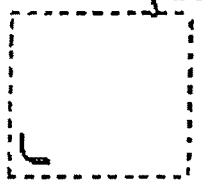
⑧ C9 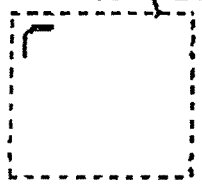
⑨ C10 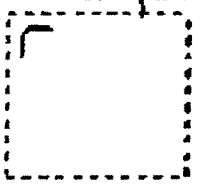
⑩ C11 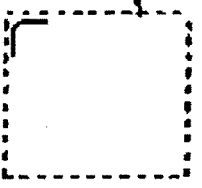
Combination example
①+④ 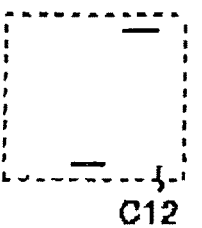
①+②+⑧+⑩ 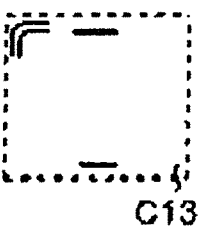
⑤+⑥+⑦ 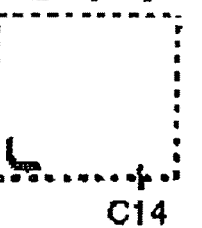
③+④+⑨ 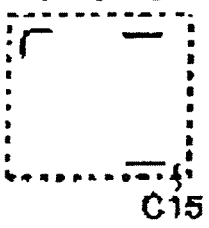
C12  C13  C14  C15

Fig.8(1) First example: Irradiation history of first correction
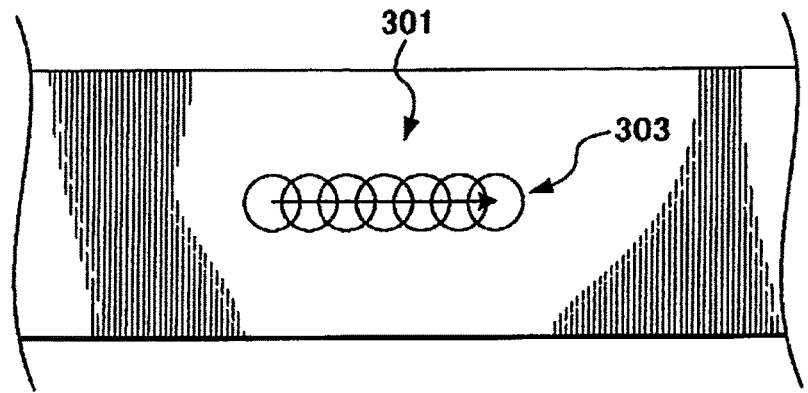
Fig.8(2) First example: Irradiation history of second correction
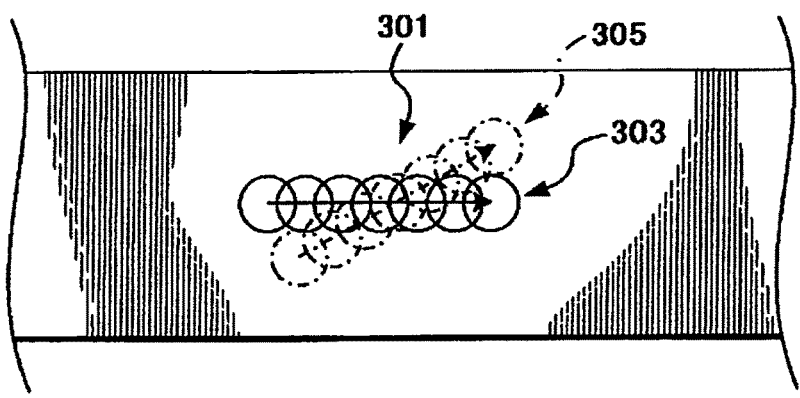
Fig.8(3) First example: Irradiation history of third correction
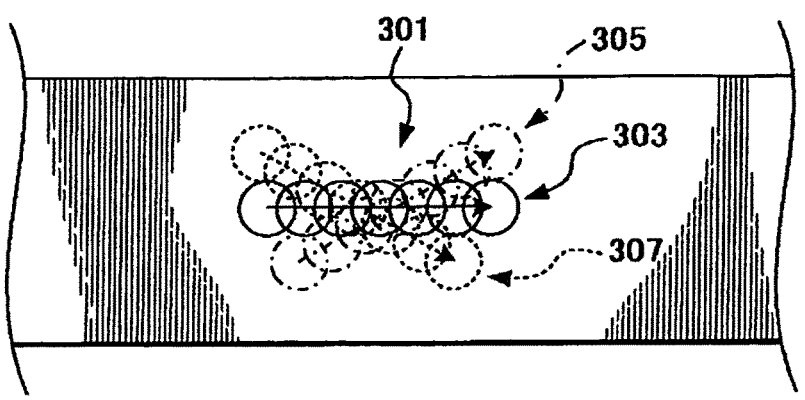

Fig.9(1) Second example: Irradiation history of first correction
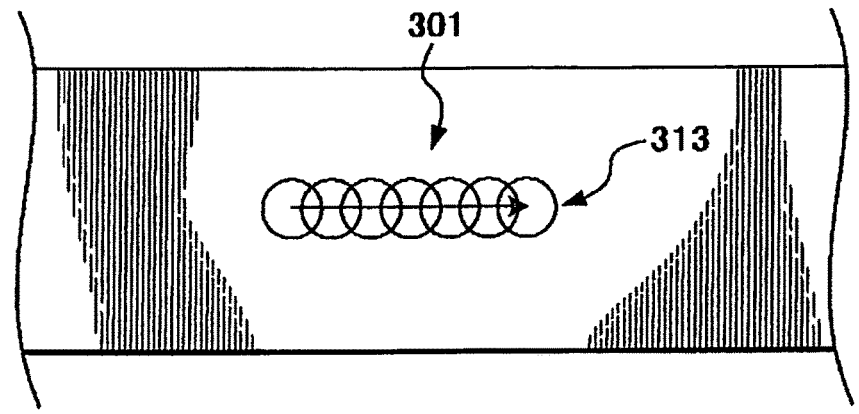
Fig.9(2) Second example: Irradiation history of second correction
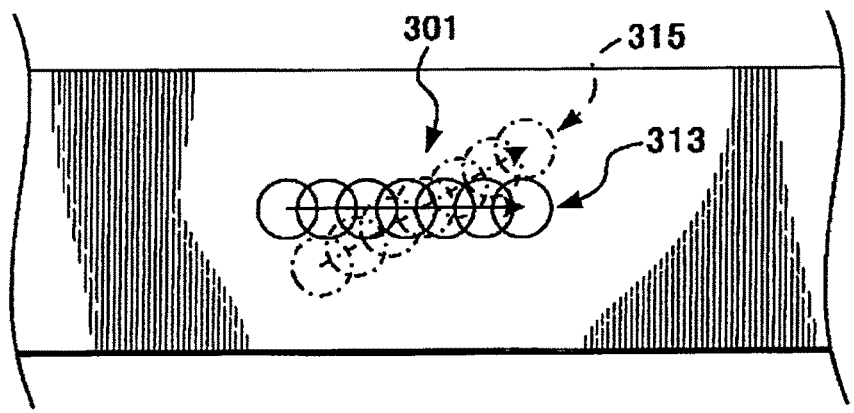
Fig.9(3) Second example: Irradiation history of third correction
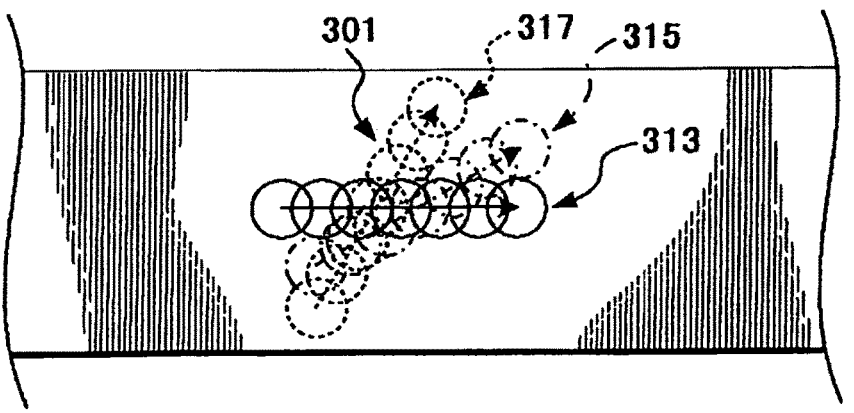

Fig.10(1) Third example: Irradiation history of first correction
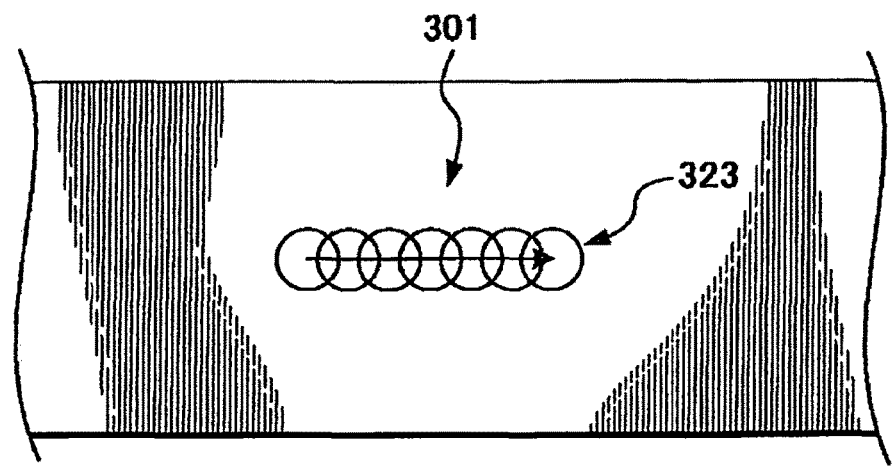
Fig.10(2) Third example: Irradiation history of second correction
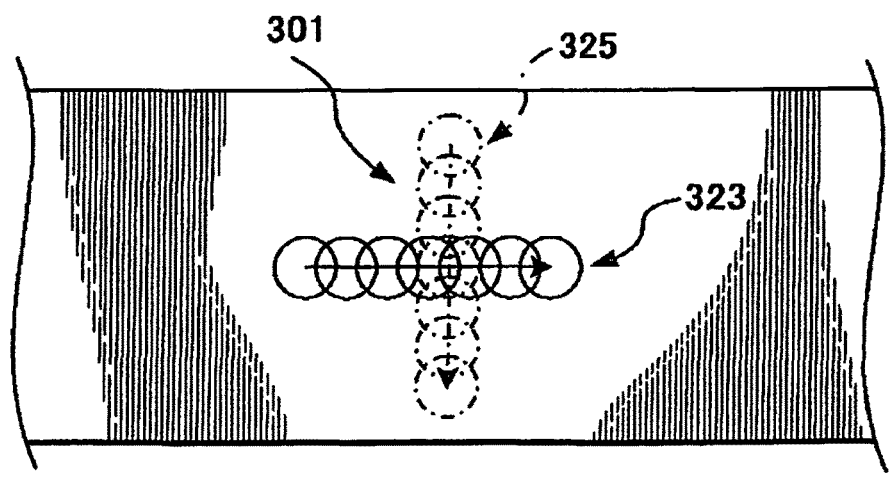

Fig.11(1) Laser irradiation history
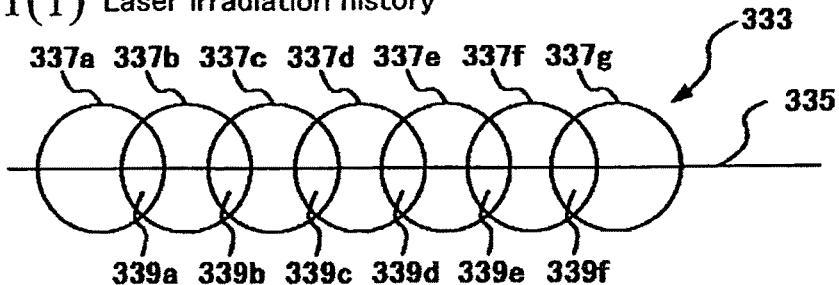
Fig.11(2) Irradiation histories crossing at 10 degrees
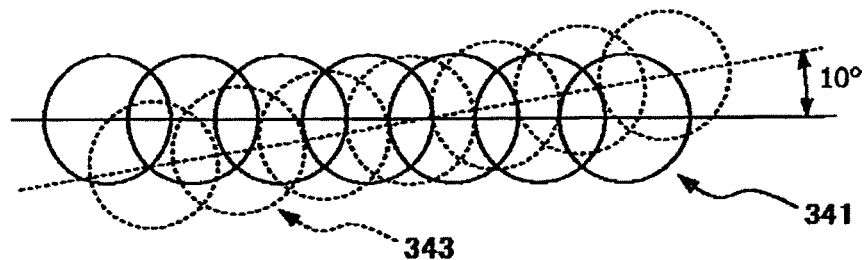
Fig.11(3) Irradiation histories crossing at 20 degrees
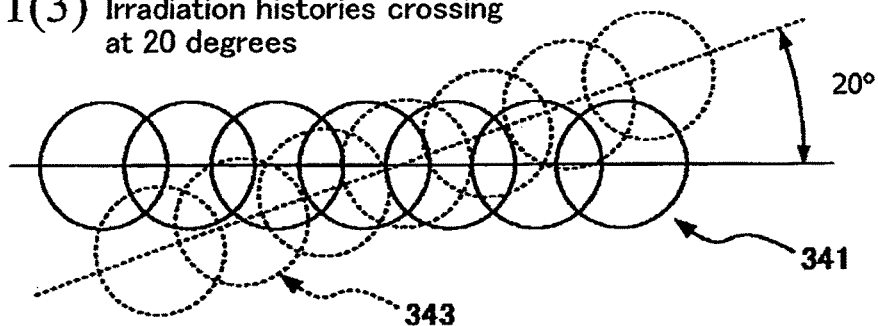
Fig.11(4) Irradiation histories crossing at 30 degrees
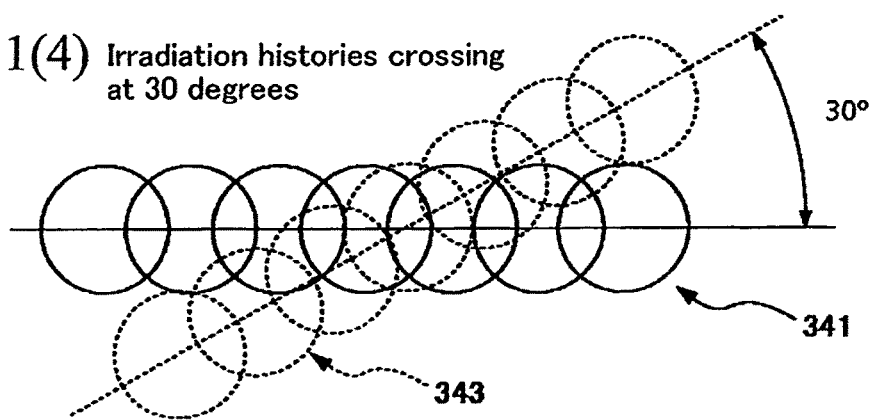

Fig.13

| Kind | Correction contents | Laser setting | | Correction amount (deg.) | | | | | |
| --- | --- | --- | --- | --- | --- | --- | --- | --- | --- |
| | | 1st Power (%) | 2nd Power (%) | Total | | | Dispersion (σ) | | |
| | | | | Pitch (+) | Roll (+) | Roll (−) | Pitch (+) | Roll (+) | Roll (−) |
| Comp. 1 | 1st | 25 | − | 0.592 | 0.091 | −0.125 | 0.004 | 0.009 | 0.009 |
| Comp. 2 | 2nd | 25 | 25 | 0.071 | 0.049 | −0.072 | 0.002 | 0.005 | 0.005 |
| Comp. 3 | 2nd | 25 | 30 | 0.150 | 0.056 | −0.093 | 0.004 | 0.007 | 0.007 |
| Comp. 4 | 2nd | 25 | 35 | 0.264 | 0.059 | −0.114 | 0.002 | 0.005 | 0.004 |
| Comp. 5 | 2nd | 25 | 40 | 0.382 | 0.078 | −0.152 | 0.004 | 0.013 | 0.008 |
| Comp. 6 | 2nd | 25 | 45 | 0.616 | 0.142 | −0.135 | 0.002 | 0.015 | 0.023 |
| Comp. 7 | 2nd | 25 | 50 | 0.761 | 0.140 | −0.172 | 0.002 | 0.022 | 0.033 |
| Invention | 2nd | 25 | 25 | 0.479 | 0.133 | −0.127 | 0.004 | 0.003 | 0.004 |

METHOD OF CORRECTING HEAD SUSPENSION, METHOD OF MANUFACTURING HEAD SUSPENSION, HEAD SUSPENSION AND METHOD OF PROCESSING THIN PLATE

BACKGROUND OF THE INVENTION

1. Field of the Invention

The present invention relates to a method of correcting the load and attitude angle of a head suspension that supports a magnetic head slider in a hard disk drive, a method of manufacturing such a head suspension, the head suspension itself, and a method of processing a thin plate. In particular, the present invention relates to a method of correcting a head suspension, capable of precisely correcting the load and attitude angle of the head suspension even if the correction is repeated a plurality of times, a method of manufacturing a head suspension with the use of the correcting method, the head suspension thus manufactured, and a thin plate processing method employing the correcting method.

2. Description of Related Art

The recording density of hard disk drives has drastically improved in recent years, and accordingly, a precision requirement for head suspensions for supporting magnetic heads in the hard disk drives is becoming severer. The head suspension is designed to apply a predetermined load onto a magnetic head attached thereto and allow the magnetic head aerodynamically rise by a predetermined distance from a disk in a hard disk drive when the disk is turned at high speed. The attitude of the magnetic head in the risen state is greatly influenced by the load, roll angle, and pitch angle of the head suspension, and therefore, the load, roll angle, and pitch angle of every head suspension must correctly be adjusted during manufacturing. In this specification, the roll and pitch angles of a head suspension will be referred to collectively as "attitude angle."

Generally, the load and attitude angle of a head suspension are corrected by holding a load beam of the head suspension or an outrigger formed at a front end of a flexure of the head suspension and by mechanically displacing, bending, or twisting the load beam or the outrigger. Mechanically holding and correcting the outrigger needs a jig specifically adjusted to the shapes of the head suspension and outrigger and a long time to move the jig, hold the outrigger, and process the outrigger. Namely, correcting a head suspension generally involves many processes and a long time.

To cope with this, Japanese Unexamined Patent Application Publication No. 2000-339894 proposes a technique of irradiating a head suspension with a laser beam, to thermally deform the head suspension and thereby correct the load and attitude angle of the head suspension. The applicant of the present invention has proposed in Japanese Unexamined Patent Application Publication No. 2004-82161 a technique of defining an irradiation area on a head suspension and irradiating the irradiation area with a laser beam, to draw a pattern of predetermined length and shape with the laser beam in the irradiation area and thereby correct the load and attitude angle of the head suspension. This technique bends an objective part of the head suspension by drawing a specific irradiation pattern in the part with a laser beam, thereby precisely correcting the load and attitude angle of the head suspension.

The precision requirement for head suspensions is continuously increasing and there is a strong need of manufacturing uniform head suspensions. To meet the requirements and needs, a head suspension must sometimes be corrected a plurality of times until it attain a specified load and a specified attitude angle.

For example, a head suspension once or several times corrected and still out of an allowable error range must be corrected again. Even an accepted head suspension must be corrected again if it shows an error after it is assembled with a magnetic head into a head gimbal assembly. Further, there is a possibility that a magnetic head already assembled with a head suspension into a head gimbal assembly shows an error in a product test. In this case, the magnetic head must be removed from the head suspension and must be replaced with another and the head suspension must be again corrected before or after it is reassembled with the replaced magnetic head (Japanese Unexamined Patent Application Publication No. 2002-93092).

The inventor of the present invention has found that, when a head suspension is corrected a plurality of times with a laser beam in such a way that a succeeding correction traces a preceding correction, the head suspension will not accurately be corrected.

When a part of a head suspension is once irradiated with a laser beam, to correct the load and attitude angle of the head suspension, substantially no change will occur in the load and attitude angle of the head suspension when the same part is again irradiated with a laser beam. This is because correcting the load and attitude angle of a head suspension with a laser beam is based on a bend produced by a thermal stress difference between a surface of the head suspension irradiated with the laser beam and an opposite surface thereof not irradiated with the laser beam.

The part once heated with a laser beam will show little change in internal stress when irradiated with a laser beam second time. Any head suspension once corrected with a laser beam does not provide an intended bend when it is irradiated with a laser beam again. This is the reason why repetitive corrections conducted on a head suspension cause a correction error in the load and attitude angle of the head suspension.

There is, therefore, a requirement for a new technique capable of precisely correcting the load and attitude angle of a head suspension or a thin plate even if a correction process is repeated a plurality of times on the head suspension (or thin plate).

SUMMARY OF THE INVENTION

An object of the present invention is to provide a method of correcting a head suspension, a method of manufacturing a head suspension, a head suspension, and a method of processing a thin plate, capable of precisely correcting an objective item even if the objective item is corrected a plurality of times.

In order to accomplish the object, an aspect of the present invention provides a method of correcting a head suspension by irradiating an objective part of the head suspension with a laser beam before or after mounting a read/write head on the head suspension. The method includes drawing, with the laser beam, a straight line of predetermined length on the objective part and repeating this process a plurality of times in such a way that the direction of a straight line drawn this time crosses the direction of a straight line drawn last time.

According to this aspect of the present invention, the correction process is carried out a plurality of times such that the direction of a straight line drawn this time crosses the direction of a straight line drawn last time. Namely, the straight line drawn this time forms a predetermined angle with the straight line drawn last time.

When the correction process is carried out a plurality of times on the same objective part, a correction error will occur. To avoid the error, this aspect of the present invention minimizes overlapping areas where lines drawn with a laser beam overlap each other on the objective part. Consequently, this aspect of the present invention can precisely correct the object even if the object is corrected a plurality of times.

BRIEF DESCRIPTION OF THE DRAWINGS

FIG. 7 is an explanatory view showing examples of characters corresponding to laser beam irradiation patterns according to the embodiment of the present invention;

FIGS. 8(1) to 8(3) are explanatory views showing a first example of a method of correcting a head suspension according to an embodiment of the present invention;

FIGS. 9(1) to 9(3) are explanatory views showing a second example of the method of correcting a head suspension according to the embodiment of the present invention;

FIGS. 10(1) and 10(2) are explanatory views showing a third example of the method of correcting a head suspension according to the embodiment of the present invention;

FIGS. 11(1) to 11(4) are explanatory views showing changes in overlapping areas of irradiation histories according to the head suspension correcting method of the embodiment of the present invention;

FIG. 13 is a table showing effect of the embodiment of the present invention in improving a head suspension correction accuracy.

DETAILED DESCRIPTION OF EMBODIMENTS

A method of correcting a head suspension, a method of manufacturing a head suspension, a head suspension, and a method of processing a thin plate according to embodiments of the present invention will be explained in detail with reference to the drawings.

First, a head suspension correcting apparatus employed by the present invention will be explained.

Figure 1:
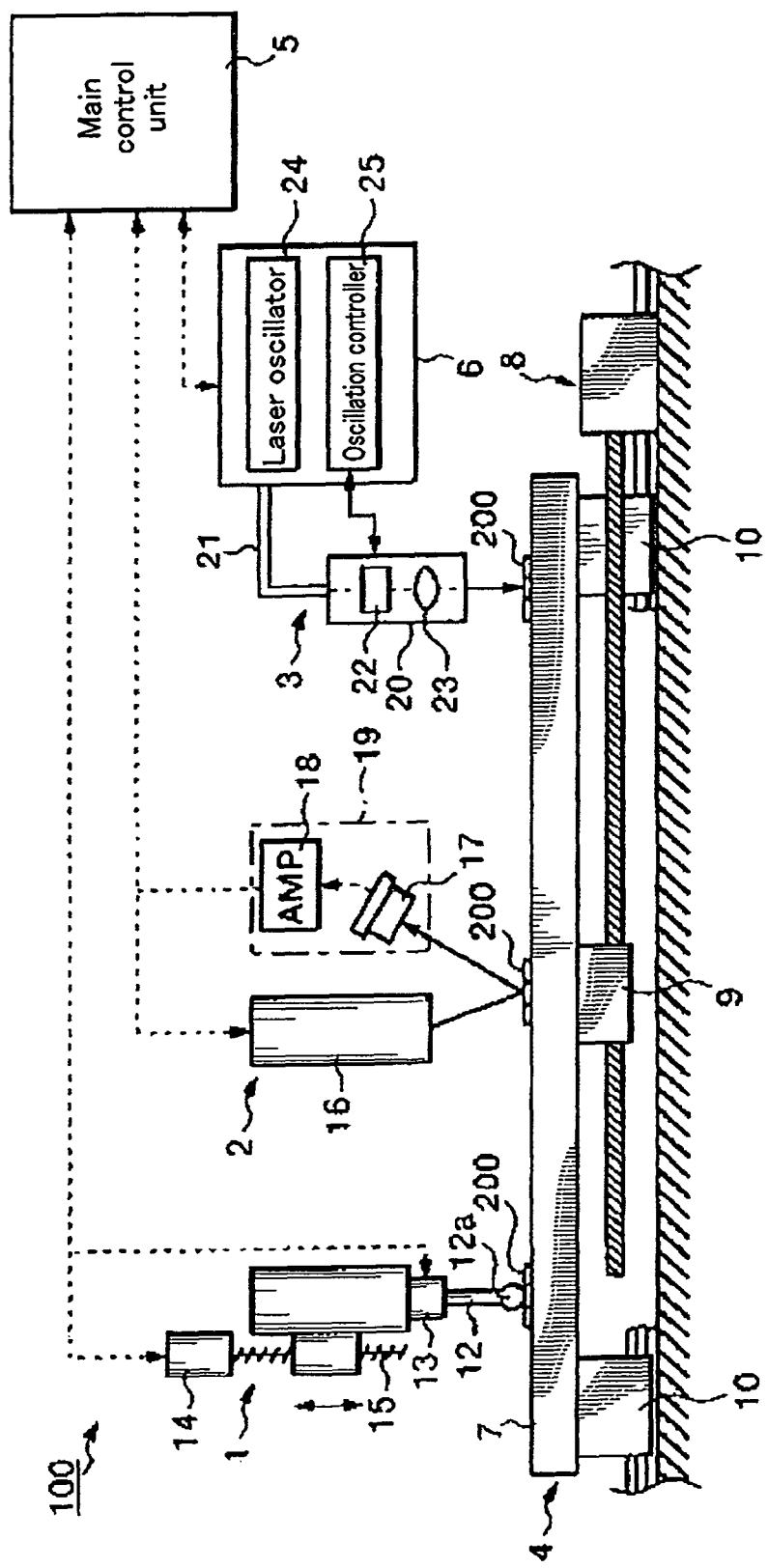
FIG. 1 is a general view showing a head suspension correcting apparatus employed by the present invention.
Figure 2:
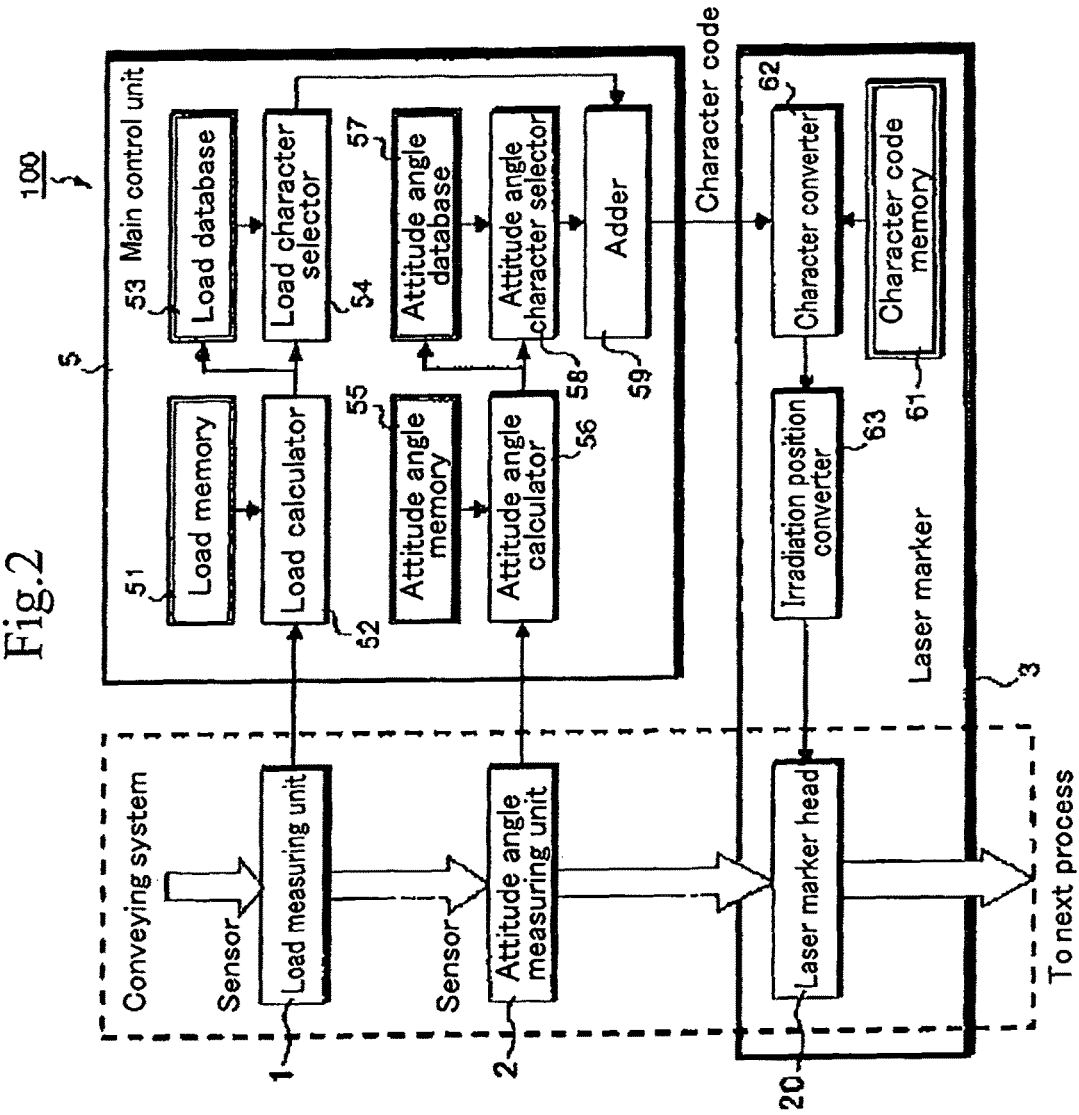
FIG. 2 is a functional block diagram showing the apparatus of FIG. 1.
Figure 3:
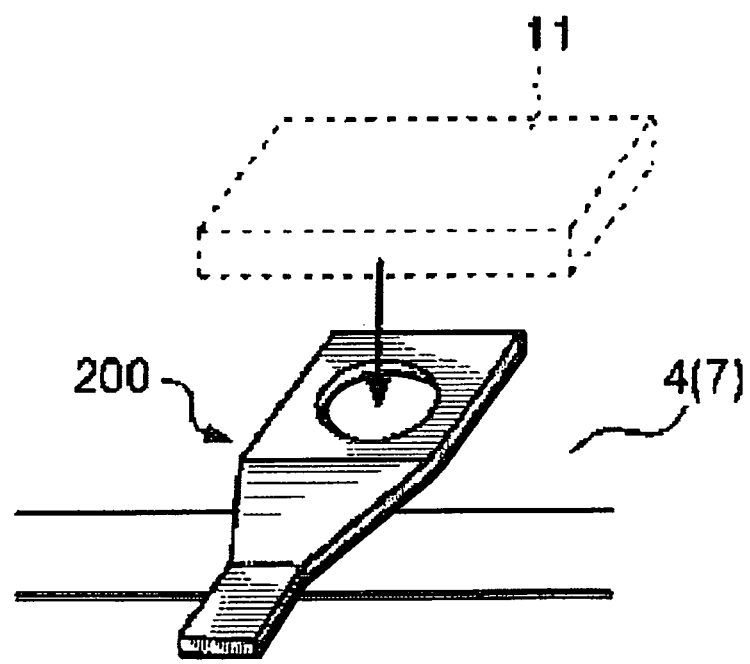
FIG. 3 is an explanatory view showing a head suspension set in the apparatus of FIG. 1, the head suspension being corrected according to the present invention.

FIG. 1 is a general view showing the head suspension correcting apparatus, FIG. 2 is a functional block diagram showing the apparatus of FIG. 1, and FIG. 3 is an explanatory view showing a head suspension set in the apparatus of FIG. 1, the head suspension being corrected according to an embodiment of the present invention.

In FIG. 1, the head suspension correcting apparatus 100 is employed to bend an objective part of a head suspension and thereby correct the load and attitude angle of the head suspension. The apparatus 100 includes a load measuring unit 1, an attitude angle measuring unit 2, a laser marker 3, a conveying unit 4, and a main control unit 5.

The conveying unit 4 conveys the head suspension 200, which is temporarily fixed to a stage 7, along the load measuring unit 1, attitude angle measuring unit 2, and laser marker 3 and positions the head suspension 200 under each of the units 1, 2, and 3. The stage 7 is moved with a servo motor 8, a ball screw 9, and a linear guide 10.

The head suspension 200 is temporarily fixed to the stage 7 by, for example, holding the same with a jig 11 on the stage 7 as indicated with a dotted line in FIG. 3. Any other means such as a suction unit, a bolt, a magnet, or the like is usable to temporarily fix the head suspension 200 to the stage 7.

The stage 7 and temporary fixing unit (11) are driven under the control of a drive controller (not shown) that is connected to and controlled by the main control unit 5.

The load measuring unit 1 includes a probe 12 and a load cell 13 attached to the probe 12. The probe 12 applies a predetermined pressure to press a specific part of the head suspension 200. The probe 12 is vertically moved with a combination of a serve motor (or stepping motor) 14 and a ball screw 15. The servo motor 14 is provided with a linear guide. The vertical movement of the probe 12 may be carried out by an actuator employing a hydraulic cylinder.

The probe 12 has a front end 12a that is substantially spherical and is pushed under a predetermined pressure to a magnetic head mounting part (to be explained later) of the head suspension 200. At this time, the load cell 13 outputs a voltage signal to the main control unit 5. Based on the voltage signal, the main control unit 5 calculates a load of the head suspension 200.

The attitude angle measuring unit 2 includes a laser source 16 and a photoreceiver 19. The laser source 16 emits a laser beam toward an objective part such as the magnetic head mounting part of the head suspension 200. The laser source 16 may be a semiconductor laser, a YAG laser, a carbon dioxide laser, or the like. Laser emitting conditions are dependent on the material and other properties of the objective part of the head suspension 200. To achieve the present invention, proper laser emitting conditions must be set according to the material and other properties of the head suspension 200.

The photoreceiver 19 has a CCD 17 to receive the laser beam reflected by the objective part such as the magnetic head mounting part of the head suspension 200 and a signal amplifier (AMP) 18. A signal from the CCD 17 is transmitted through the amplifier 18 to the main control unit 5, which calculates an attitude angle of the head suspension 200 according to the signal.

The load measuring unit 1 and attitude angle measuring unit 2 are positioned upstream from the laser marker 3 in a process flow.

The laser marker 3 is a standard laser marker that emits a laser beam to an object, to evaporate, reform, or color-change the surface of the object with heat of the laser beam, so that the laser irradiated part of the object may provide a different view compared with the remaining part of the object.

The laser marker 3 installed in the head suspension correcting apparatus 100 employed for the present invention is a standard laser marker.

Namely, the apparatus 100 can employ applications belonging to the laser marker 3 when correcting the head suspension 200 with a laser beam.

The apparatus 100 selects proper ones from among characters, graphical marks, and symbols originally provided for the laser marker 3, or combinations thereof and draws the selected ones on the head suspension 200 with a laser beam, to correct the load and attitude angle of the head suspension 200.

The laser marker 3 includes a laser marker head 20 and a laser marker body 6 that is connected through a light guide 21 such as an optical fiber to the laser marker head 20. The laser marker body 6 oscillates and emits a laser beam, which is transmitted through the light guide 21 to the laser marker head 20 from which the laser beam is emitted toward the head suspension 200.

In the laser marker head 20, a galvano-scanner mirror 22 deflects the laser beam in an X-Y direction and a condenser lens 23 properly adjusts the energy density distribution of the laser beam. The deflected and adjusted laser beam is emitted toward the head suspension 200.

The laser marker body 6 incorporates a laser oscillator 24 and an oscillation controller 25. The laser oscillator 24 excites an oscillation medium such as YAG with a flash lamp, a laser diode, or the like, to emit a laser beam.

The oscillation controller 25 synchronizes the laser oscillation with the driving of the mirror 22 and controls the laser marker head 20 so that the laser beam is emitted to an objective part defined on the head suspension 200. The laser oscillator 24 may employ a single-mode laser that can reduce the diameter of a laser spot. In this case, the oscillation controller 25 can correctly emit a laser beam to a target part on the head suspension 200 even if the target part is located in a narrow space between wires of the head suspension 200.

The condenser lens 23 may have a long focal distance to provide a deep focal depth. This may minimize a change in energy density at a laser beam irradiated part of the head suspension 200 even if the distance between the laser marker head 20 and the head suspension 200 more or less varies.

In this case, there will be no need of conducting precise focal length control that must be carried out according to a related art when the distance between the laser marker head 20 and the head suspension 200 varies.

The main control unit 5 determines a load correcting character drawn with a laser beam and an attitude angle correcting character drawn with a laser beam and generates character codes representing the determined characters.

As shown in FIG. 2, the main control unit 5 includes a load memory 51, a load calculator 52, a load database 53, and a load character selector 54.

The load memory 51 stores a load set for the head suspension 200. The load calculator 52 calculates a load adjustment value according to the set load and the output signal from the load measuring unit 1. The load database 53 stores a combination of load characters for each load. The load character selector 54 selects, from among the data stored in the load database 53, an optimum combination of load characters according to the load adjustment value calculated by the load calculator 52, the optimum combination of load characters being used to properly correct the load of the head suspension 200.

The main control unit 5 also includes an attitude angle memory 55, an attitude angle calculator 56, an attitude angle database 57, and an attitude angle character selector 58.

The attitude angle memory 55 stores an attitude angle set for the head suspension 200. The attitude angle calculator 56 calculates an attitude angle adjustment value according to the set attitude angle and the output signal from the attitude angle measuring unit 2. The attitude angle database 57 stores a combination of attitude angle characters for each attitude angle. The attitude angle character selector 58 selects, from among the data stored in the attitude angle database 57, an optimum combination of attitude angle characters according to the attitude angle adjustment value calculated by the attitude angle calculator 56, the optimum combination of attitude angle characters being used to properly correct the attitude angle of the head suspension 200.

The main control unit 5 also includes an adder 59. The adder 59 adds the load character combination selected by the load character selector 54 and the attitude angle combination selected by the attitude angle character selector 58 to each other. The adder 59 then sends a character code representing the sum of the character combinations to the laser marker 3.

The functional blocks of the main control unit 5 shown in FIG. 2 are realized by hardware such as a CPU and memories and software.

The laser marker 3 emits a laser beam to the head suspension 200 according to the character code sent from the main control unit 5. For this, the oscillation controller 25 of the laser marker 3 includes a character code memory 61, a character converter 62, and an irradiation position converter 63.

The character code memory 61 stores character codes and corresponding irradiation patterns. The character converter 62 decodes the character code sent from the adder 59 into an irradiation pattern according to the data stored in the character code memory 61.

The irradiation pattern is a character shape, a graphical shape, a symbolic shape, or the like to be drawn on the surface of an objective part of the head suspension 200 with a laser beam or with laser beam spots.

The irradiation position converter 63 converts the irradiation pattern converted by the character converter 62 into data representing positions and shapes on the head suspension 200 to be irradiated with a laser beam. This data is sent to the laser marker head 20.

The functional blocks of the oscillation controller 25 shown in FIG. 2 are realized by hardware such as a CPU and memories and software.

The head suspension 200 to be corrected by the head suspension correcting apparatus 100 will be explained.

Figure 4:
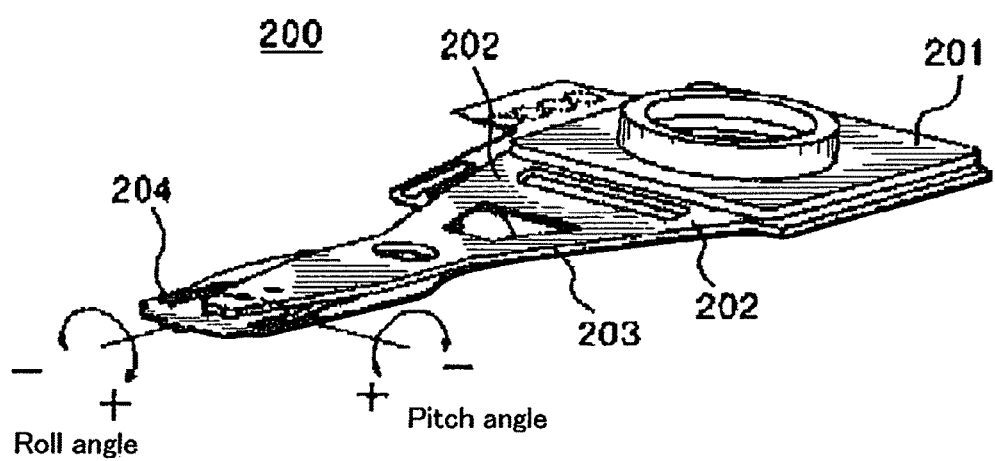
FIG. 4 is a perspective view showing a head suspension to be corrected according to the present invention.
Figure 5:
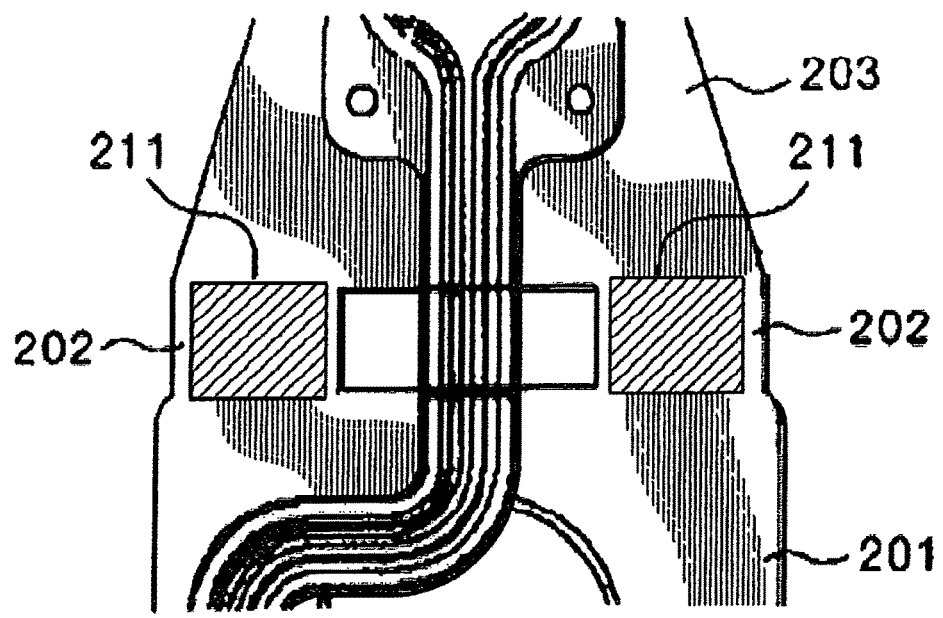
FIG. 5 is an explanatory view showing a laser beam irradiation area defined on a load producing bend of a head suspension according to an embodiment of the present invention.
Figure 6:
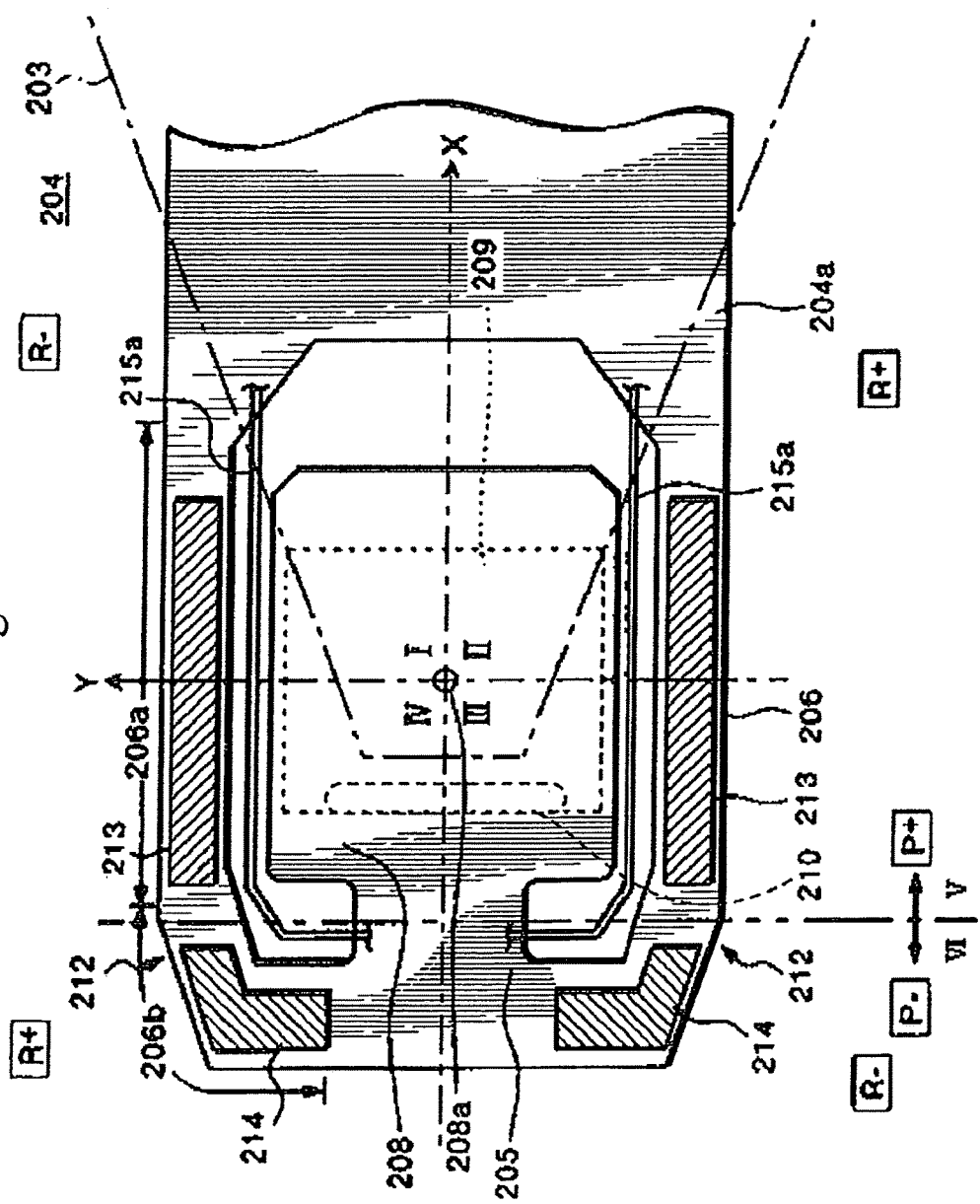
FIG. 6 is an explanatory view showing laser beam irradiation areas defined on an attitude angle adjusting part of a head suspension according to the embodiment of FIG. 5.

FIG. 4 is a perspective view showing the head suspension 200 to be corrected, FIG. 5 is an explanatory view showing a laser beam irradiation area defined on a load producing bend of the head suspension 200, FIG. 6 is an explanatory view showing laser beam irradiation areas defined on an attitude angle adjusting part of the head suspension 200, and FIG. 7 is an explanatory view showing examples of characters corresponding to laser beam irradiation patterns.

In FIG. 4, the head suspension 200 has a base plate 201, the load producing bend 202, and a load beam 203 connected to the base plate 201 with the load producing bend 202. The load beam 203 is made of a precision thin plate spring and functions to apply a load onto a magnetic head 209 to be explained later. The load beam 203 is made from a metal plate (having a thickness in the range of several tens of micrometers to a hundred micrometers) such as an austenite-based stainless steel plate based on Japanese Industrial Standard SUS304 or SUS305.

A flexure 204 is fixed to a front end of the load beam 203 by spot-welding. As shown in FIG. 6, the flexure 204 has a gimbal spring 205, an outrigger 206, and a magnetic head mount 208. The flexure 204 is fixed to the load beam 203 through a fitting part. The magnetic head mount 208 is in contact with a dimple 208a formed at a front end of the load beam 203. When the magnetic head 209 is mounted on the magnetic head mount 208, the dimple 208a is positioned substantially at the center of the magnetic head 209.

The flexure 204 is formed by etching or punching a stainless plate into a predetermined shape. The magnetic head 209 is mounted on the magnetic head mount 208 and is provided with a magnetic head element 210 at an end of the magnetic head 209, as indicated with dotted lines in FIG. 6.

The base plate 201 and load beam 203 may be formed integrally, or may be formed separately and joined together by spot-welding. The load beam 203 and load producing bend 202 may be formed integrally and the load producing bend 202 may partly or entirely be thinned by etching. The load producing bend 202 may separately be formed, fixed to the load beam 203, and attached to the base plate 201 by spot-welding.

The load producing bend 202 is bent beforehand in a pitch direction (FIG. 4) by, for example, pressing, so that a proper load is applied to the magnetic head mount 208. As mentioned above, the bending of the head suspension 200 is mechanically carried out, and therefore, the load applied to the magnetic head mount 208 must be corrected later to a specified value. The head suspension 200 must further be corrected so that the magnetic head mount 208 may face a disk in a hard disk drive at a proper attitude angle.

As shown in FIGS. 4 and 5, the load producing bend 202 includes, for example, a pair of legs extending between the base plate 201 and the load beam 203. The load producing bend 202 may be thinned, if required.

On the load producing bend 202, an irradiation area 211 is defined. The irradiation area 211 is an objective part that is irradiated with a laser beam to bend or correct the head suspension 200.

The head suspension 200 is irradiated with a laser beam within the irradiation area 211 according to a calculated length and shape, as will be explained later in detail. In the irradiation area 211 defined on the load producing bend 202, a length to be irradiated with a laser beam is selected from, for example, four kinds of lengths according to the degree of correction (load adjusting quantity).

The irradiation areas 211 are defined left-right symmetrically, the head suspension 200 will bend in a pitch direction (FIG. 4).

On the flexure 204, there are defined irradiation areas 213 and 214 as shown in FIG. 6. The irradiation areas 213 and 214 form an attitude angle adjusting part 212 that is an objective part of the head suspension 200 to be irradiated with a laser beam. The irradiation area 213 is defined on a straight part 206a extending from a base 204a of the outrigger 206. The irradiation area 214 is defined at a curve 206b between the straight part 206a and the gimbal spring 205.

Correcting the irradiation areas 213 and 214 with a laser beam results in correcting the roll and pitch angles of the head suspension 200 (FIG. 4).

To explain the correction of the roll and pitch angles of the head suspension 200, X and Y axes are set to pass the center (generally, the position of the dimple 208a) of the magnetic head mount 208, and around the X and Y axes, zones I to IV are defined. Irradiating the zones I to IV with a laser beam results in correcting the roll angle of the head suspension 200.

More precisely, irradiating the zones II and III on the outrigger 206 with a laser beam results in correcting the roll angle of the head suspension 200 in a negative (−) direction and irradiating the zones I and IV on the outrigger 206 with a laser beam results in correcting the roll angle of the head suspension 200 in a positive (+) direction.

A center line passing the center of the gimbal spring 205 and laterally crossing the gimbal spring 205 is set to define zones V (first zone) and VI (second zone). Irradiating the zone V with a laser beam results in correcting the pitch angle of the head suspension 200 in a positive (+) direction and irradiating the zone VI with a laser beam results in correcting the pitch angle of the head suspension 200 in a negative (−) direction.

Combining the above-mentioned corrections results in correcting the roll and pitch angles of the head suspension 200 to specified values.

The head suspension 200 shown in FIGS. 4 to 6 is only an example. Any head suspension having any shape is correctable according to the present invention by properly defining an irradiation area at a location of the head suspension that controls the load and attitude angle of the head suspension and by irradiating the irradiation area with a laser beam. The shape and other characteristics of the irradiation area are determined according to the shape, material, and other conditions of the head suspension.

Each head suspension may have a different irradiation area having a specific shape and other characteristics. The shape, position, and other characteristics of an irradiation area to be defined on a given head suspension are empirically determined or are simulated by computer.

In FIG. 6, the irradiation areas (irradiation objective parts) 213 and 214 are set not to overlap a wiring area 215a between the outrigger 206 and the magnetic head mount 208. The wiring area 215a is, for example, a flexible substrate including copper wires and insulating layers. In practice, the wiring area 215a is spatially spaced away from the outrigger 206.

The wiring area 215a must not be irradiated with a laser beam. If the wiring area 215a is irradiated with a laser beam, the cupper wires will be cut or the flexible substrate will burn.

To avoid this, the embodiment of the present invention defines the irradiation areas 213 and 214 out of the wiring area 215a, so that the wiring area 215a will not be irradiated with a laser beam and the copper wires will not be cut with the laser beam.

When an objective part defined on the head suspension 200 is irradiated with a laser beam, thermal deformation occurs at the objective part to correct the load and attitude angle of the head suspension 200. Before achieving this, an amount of thermal deformation to occur must be estimated for each of the irradiation areas 211, 213, and 214 and must be stored in a database.

When a laser beam is emitted for a given interval to draw a shape in one of the irradiation areas 211, 213, and 214, the load producing bend 202 or the attitude angle adjusting part 212 deforms. A relationship between the laser beam irradiation shape and the deformation must be measured by test or simulation and must be stored in a database.

An example of such data stored in a database is a character representative of a shape to be drawn on the head suspension 200 with a laser beam to correct the load and attitude angle of the head suspension 200. Each character stored in the database specifies a shape or a pattern to be drawn with a laser beam in an objective part of the head suspension 200, the shape drawn with a laser beam corresponding to a load adjustment amount or an attitude angle adjustment amount. The database corresponds to the load database 53 and attitude angle database 57 prepared in the main control unit 5.

FIG. 7 shows examples of irradiation patterns or characters stored in the laser marker 3. A character C1 is an irradiation pattern (alphabet) used in standard use of the laser marker 3. Characters C2 to C11 are irradiation patterns used for correcting the load and attitude angle of the head suspension 200. For example, the character C2 is used to draw a segment with a laser beam at a lower central location in a predetermined frame and the character C3 is used to draw a segment with a laser beam at an upper central location in the predetermined frame. Similarly, the characters C4 to C11 are used to draw patterns at predetermined locations in the predetermined frame.

Characters C12 to C15 each represent a combination of characters. For example, the character C12 is a combination of the characters C2 and C5 used to correct the load and attitude angle of the head suspension 200. Similarly, the characters C13 to C15 are character combinations used to correct the load and attitude angle of the head suspension 200.

In practice, many character combinations are prepared to entirely cover required ranges of load and attitude angle adjustments.

When a character is selected to correct, for example, the roll angle (pitch angle) of the head suspension 200, the correction unavoidably affects the pitch angle (roll angle) of the head suspension 200. Namely, it is impossible to correct the roll angle or the pitch angle alone with a single character.

Accordingly, a practical correction of the head suspension 200 is carried out by properly combining characters.

Character combinations are represented with codes and are stored in the load database 53 and attitude angle database 57. The load character selector 54 selects a proper character combination for adjusting the load of the head suspension 200 and the attitude angle character selector 58 selects a proper character combination for adjusting the attitude angle of the head suspension 200. The selected character combinations are added to each other in the adder 59, which provides a character code representing the resultant sum. The character code is converted by the character converter 62 into positional data according to data stored in the character code memory 61. The positional data is converted by the irradiation position converter 63 into irradiation position data.

Examples of the method of correcting a head suspension (thin plate) according to the embodiment of the present invention will be explained in detail with reference to FIGS. 8 to 11.

Figure 12:
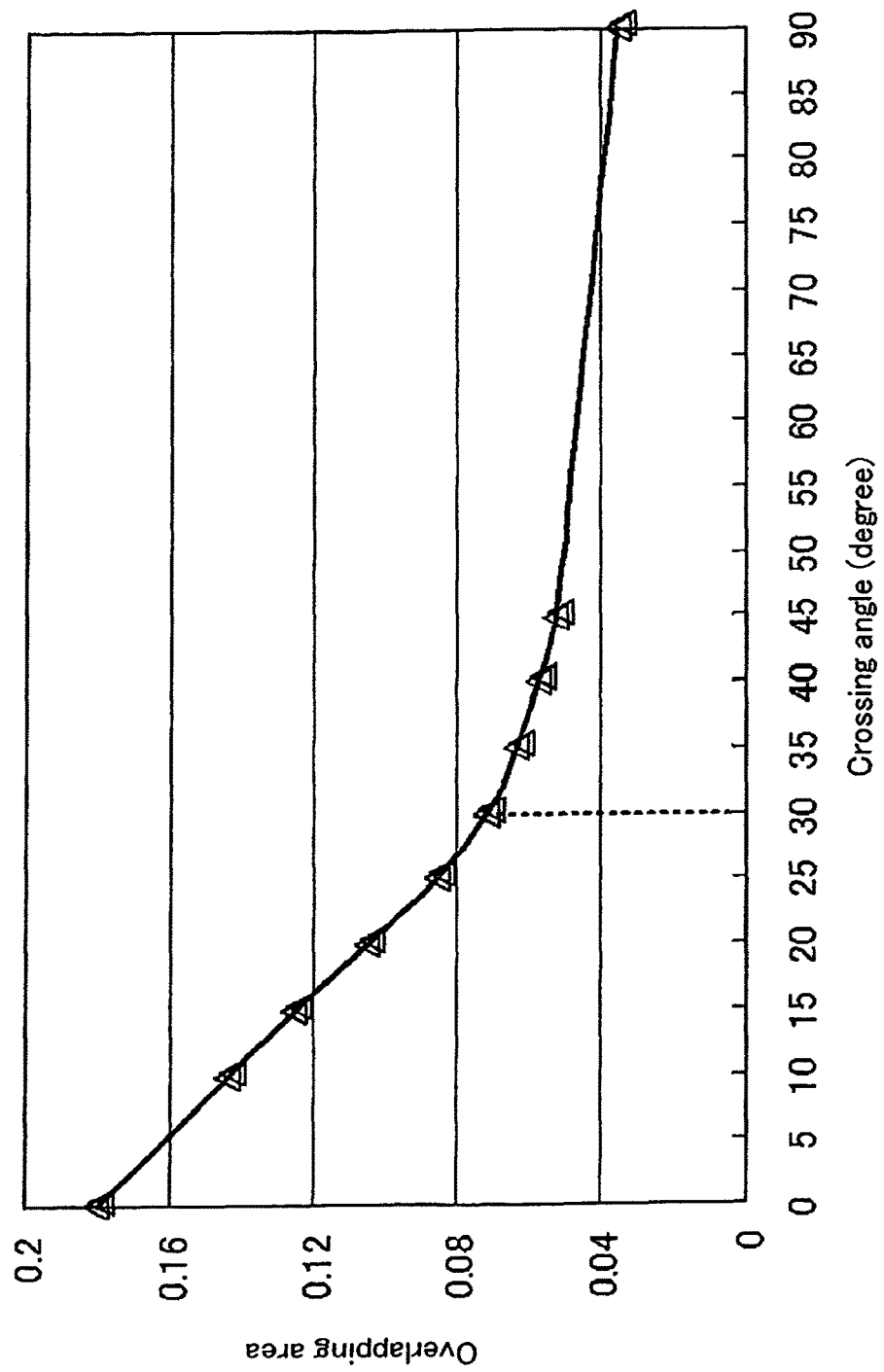
FIG. 12 is a graph plotted from the overlapping area changes shown in FIGS. 11(1) to 11(4)

FIGS. 8(1) to 8(3) are explanatory views showing a first example of the method of correcting a head suspension according to the embodiment of the present invention, FIGS. 9(1) to 9(3) are explanatory views showing a second example of the method of correcting a head suspension according to the embodiment of the present invention, FIGS. 10(1) and 10(2) are explanatory views showing a third example of the method of correcting a head suspension according to the embodiment of the present invention, FIGS. 11(1) to 11(4) are explanatory views showing changes in overlapping areas of irradiation histories according to the head suspension correcting method of the embodiment of the present invention, FIG. 12 is a graph plotted from the overlapping area changes shown in FIGS. 11(1) to 11(4), and FIG. 13 is a table showing effect of the embodiment of the present invention in improving a head suspension correction accuracy.

First, an outline of the method of correcting a head suspension according to the embodiment of the present invention will be explained.

The load and attitude angle of the head suspension 200 or of a thin plate are corrected by irradiating an objective part, for example, any one of the irradiation areas 211, 213, and 214 with a laser beam. It is sometimes required to repeat such a correction a plurality of times.

If a laser beam of this time of correction traces a correction history of the last time of correction in a plurality of corrections, the load and attitude angle of the head suspension 200 will not precisely be corrected due to residual thermal stress, as mentioned above.

Namely, any part already heated with a laser beam shows little change in internal stress when irradiated with a laser beam second time. Then, a bend produced by the second time laser beam on the head suspension 200 will be smaller than an intended one. This is the reason why an error occurs in a plurality of corrections made on the head suspension 200.

The head suspension 200 is a very fine product, and in some cases, it is difficult to change irradiation locations whenever correcting the head suspension 200 with a laser beam. In this case, it is unavoidable to repeatedly correct the same part of the head suspension 200.

The head suspension correcting method according to the present invention is capable of precisely conducting a plurality of corrections on the head suspension 200.

The present invention corrects the load and attitude angle of the head suspension 200 by irradiating an objective part of the head suspension 200 with a laser beam and thereby bending the head suspension 200 before or after mounting a read/write head onto the head suspension 200.

When correcting the head suspension 200 a plurality of times by linearly irradiating the head suspension 200 with a laser beam, the embodiment of the present invention draws a first straight line on the surface of an objective part of the head suspension 200 with the laser beam and then draws a second straight line on the surface of the objective part with the laser beam in such a way that the second straight line crosses the first straight line. Namely, the direction of the second straight line forms a predetermined angle with the direction of the first straight line. The predetermined angle is, for example, in the range of about 30 degrees to 150 degrees.

Now, examples of the method of correcting a head suspension according to the embodiment of the present invention will be explained.

FIGS. 8(1) to 8(3) show the first example of the head suspension correcting method according to the embodiment of the present invention. This example intermittently emits a laser beam to an objective part 301 of the head suspension 200 linearly along a first straight line extending in a first direction. The first direction is a longitudinal direction of the objective part 301 and is indicated with a continuous arrow in FIGS. 8(1) to 8(3).

This laser beam emission forms a first history 303 of irradiation spots, the irradiation spots being continuously aligned linearly along the first straight line on the surface of the objective part 301, as shown in FIG. 8(1).

Thereafter, the first example intermittently emits a laser beam to the objective part 301 linearly along a second straight line extending in a second direction, thereby forming a second history 305 of irradiation spots, the irradiation spots being continuously aligned along the second straight line on the surface of the objective part 301, as shown in FIG. 8(2). The second direction forms a predetermined angle with the first direction. The predetermined angle is, for example, −30 degrees. Namely, the second direction is inclined from the first direction by about 30 degrees in a counterclockwise direction.

Thereafter, the first example intermittently emits a laser beam to the objective part 301 linearly along a third straight line extending in a third direction, thereby forming a third history 307 of irradiation spots, the irradiation spots being continuously aligned along the third straight line on the surface of the objective part 301, as shown in FIG. 8(3). The third straight line is substantially symmetrical to the second straight line with respect to the first straight line.

The three irradiation histories 303, 305, and 307 made along the first to third straight lines are positionally shifted from one another so that they do not cross one another at the same intersection. This is because, if the irradiation histories 303, 305, and 307 cross one another at the same intersection, thermal stress caused by the laser irradiation concentrates at the intersection. If such thermal stress concentration occurs, an error in correcting the head suspension 200 increases and such an error increase must be avoided.

FIGS. 9(1) to 9(3) show the second example of the head suspension correcting method according to the embodiment of the present invention. This example intermittently emits a laser beam to an objective part 301 of the head suspension 200 linearly along a first straight line extending in a first direction, which is the same as the first direction of the first example. This laser beam emission forms a first history 313 of irradiation spots, the irradiation spots being continuously aligned along the first straight line on the surface of the objective part 301, as shown in FIG. 9(1).

Thereafter, the second example intermittently emits a laser beam to the objective part 301 linearly along a second straight line extending in a second direction, thereby forming a second history 315 of irradiation spots, the irradiation spots being continuously aligned along the second straight line on the surface of the objective part 301, as shown in FIG. 9(2). The second direction forms a predetermined angle with the first direction. The predetermined angle is, for example, −30 degrees.

Thereafter, the second example intermittently emits a laser beam to the objective part 301 linearly along a third straight line extending in a third direction, thereby forming a third history 317 of irradiation spots, the irradiation spots being continuously aligned along the third straight line on the surface of the objective part 301, as shown in FIG. 9(3). The third direction forms the predetermined angle, i.e., −30 degrees with the second direction.

Like the first example, the three irradiation histories 313, 315, and 317 made along the first to third straight lines are positionally shifted from one another so that they do not cross one another at the same intersection, thereby preventing a correction error increase.

FIGS. 10(1) and 10(2) show the third example of the head suspension correcting method according to the embodiment of the present invention. This example intermittently emits a laser beam to an objective part 301 of the head suspension 200 linearly along a first straight line extending in a first direction, which is the same as the first direction of the first example. This laser beam emission forms a first history 323 of irradiation spots, the irradiation spots being continuously aligned along the first straight line on the surface of the objective part 301, as shown in FIG. 10(1).

Thereafter, the third example intermittently emits a laser beam to the objective part 301 linearly along a second straight line extending in a second direction, thereby forming a second history 325 of irradiation spots, the irradiation spots being continuously aligned along the second straight line on the surface of the objective part 301, as shown in FIG. 10(2). The second direction substantially forms a right angle with the first direction.

A method of processing a thin plate according to an embodiment of the present invention is based on any one of the above-mentioned first to third examples of the head suspension correcting method. Namely, the thin plate processing method irradiates the thin plate with a laser beam and bends the thin plate with the laser beam. The method includes drawing, with the laser beam, a straight line of predetermined length on the thin plate and repeating this process a plurality of times in such a way that the direction of a straight line drawn this time crosses the direction of a straight line drawn last time.

The "irradiation history" is a trace formed by irradiating an objective part of a thin plate such as a head suspension with a laser beam along a line on the surface of the objective part.

The irradiation history may be visible or invisible on the surface of the objective part. Namely, the irradiation history may be a stress history that is formed by heat of the laser beam and is invisible on the objective part. Once the objective part is irradiated with a laser beam, the objective part is considered to have an irradiation history without regard to whether the irradiation history is visible or invisible from the appearance of the objective part.

The irradiation history consists of spots or a trace made by laser irradiation to bend the thin plate (head suspension) and correct the load and attitude angle of the thin plate (head suspension). The irradiation spots or the trace are confirmable or not confirmable from the appearance of the thin plate (head suspension).

FIG. 11(1) shows an irradiation history 333 formed according to any one of the first to third examples of the head suspension correcting method of the present invention. Namely, the irradiation history 333 corresponds to one of the irradiation histories 303, 305, 307, 313, 315, 317, 323, and 325.

The irradiation history 333 is formed by intermittently emitting a laser beam to an objective part of a head suspension (or a thin plate) linearly along a center line 335. In FIG. 11(1), the irradiation history 333 consists of seven irradiation spots 337*a* to 337*g* aligned along the center line 335. The number of the irradiation spots may be optional.

Adjacent ones of the irradiation spots 337*a* to 337*g* partly overlap each other, to form overlapping parts 339*a* to 339*f*. The irradiation spots 337*a* to 337*g* are formed at regular intervals.

The overlapping parts 339*a* to 339*f* of the irradiation spots 337*a* to 337*g* formed according to the embodiment of the present invention substantially cause no correction error.

This is because the embodiment of the present invention sets laser irradiation conditions so that a central part of each irradiation spot has a higher irradiation energy density and a peripheral part (the overlapping part) thereof has a lower irradiation energy density.

The present invention may employ other laser irradiation conditions. For example, the peripheral part of an irradiation spot may have also a high irradiation energy density. In this case, it is preferable to form irradiation spots so that adjacent irradiation spots may not overlap each other.

An interval between adjacent irradiation spots may be optional. For example, the irradiation spots 337*a* to 337*g* may be aligned at relatively wide intervals without forming the overlapping parts 339*a* to 339*f*. It is also possible to make the irradiation spots 337*a* to 337*g* at irregular intervals.

Crossing angles and overlapping areas formed by a plurality of irradiation histories will be explained with reference to FIGS. 11(2) to 11(4) and 12.

FIGS. 11(2) to 11(4) and 12 show a preceding irradiation history 341 and a succeeding irradiation history 343 formed just after the preceding irradiation history 341. A crossing angle between the irradiation histories 341 and 343 is changed and changes in overlapping areas between the irradiation histories 341 and 343 are measured.

In FIG. 11(2), the crossing angle between the irradiation histories 341 and 343 is 10 degrees. In FIG. 11(3), the crossing angle is 20 degrees. In FIG. 11(4), the crossing angle is 30 degrees.

Compared with the crossing angles of 10 and 20 degrees, the crossing angle of 30 degrees apparently involves smaller overlapping areas between the irradiation histories 341 and 343.

This fact is also apparent in the graph of FIG. 12 that shows changes in overlapping areas with respect to changes in the crossing angle between the irradiation histories 341 and 343. It is understood from FIG. 12 that a correlation between an increase in the crossing angle and a decrease in the overlapping areas becomes gradual from around the crossing angle of about 30 degrees. It is preferable, therefore, to set the crossing angle in the range of about 30 degrees to 150 degrees.

Effect of the embodiment of the present invention in improving a head suspension correction accuracy will be explained with reference to FIG. 13.

In FIG. 13, a comparative example 1 once irradiates the irradiation area 213 of the outrigger 206 of the head suspension 200 (FIG. 6) with a laser beam and measures a correction amount in the attitude angle of the head suspension 200, the correction amount corresponding to a bend caused by the irradiation of the laser beam. The comparative example 1 emits a laser beam at 25% laser power and moves the laser beam in a longitudinal direction of the irradiation area 213.

A comparative example 2 irradiates the irradiation area 213 with a laser beam twice each time at 25% laser power. The second irradiation traces an irradiation history made by the first irradiation.

Comparative examples 3 to 7 each irradiate the irradiation area 213 with a laser beam twice, first time at 25% laser power and second time at different laser power, i.e., the comparative example 3 at 30% laser power, the comparative example 4 at 35% laser power, the comparative example 5 at 40% laser power, the comparative example 6 at 45% laser power, and the comparative example 7 at 50% laser power.

In FIG. 13, "Invention" is based on the third example of the method of correcting a head suspension according to the embodiment of the present invention. More precisely, the "Invention" once irradiates the irradiation area 213 with a laser beam like the comparative example 1, and thereafter, irradiates the irradiation area 213 with a laser beam so that the second irradiation history substantially forms a right angle with the first irradiation history (FIG. 10(2)). Each laser irradiation is carried out at 25% laser power.

In FIG. 13, an attitude angle correction amount of the second irradiation of each of the comparative examples 2 to 7 is smaller than that of the first irradiation of the comparative example 1. According to the comparative examples 2 to 7, gradually increasing laser power results in increasing a correction amount accordingly. However, it also increases dispersion. It is understood from this that the conventional techniques of the comparative examples 2 to 7 are incapable of precisely correcting the load and attitude angle of a head suspension.

On the other hand, the present invention ("Invention" in FIG. 13) shows substantially the same correction amount in each of the first and second irradiation operations, to realize precise correction of the load and attitude angle of a head suspension.

As explained above, the head suspension correcting method of the present invention conducts a plurality of corrections on a head suspension by irradiating the head suspension with a laser beam such that an irradiation history (trace) of a succeeding laser beam crosses an irradiation history (trace) of a preceding laser beam. Namely, the succeeding irradiation history forms a predetermined angle with the preceding irradiation history.

As a result, the method of the present invention can minimize overlapping areas of laser beam irradiation histories (traces) that may cause a correction error of a head suspension. Namely, the method of the present invention can precisely correct the load and attitude angle of a head suspension through a plurality of corrections.

The first and second examples of the head suspension correction method according to the present invention suggest how to direct a laser beam when conducting a plurality of corrections.

The first and second examples can precisely correct the load and attitude angle of a head suspension and smoothly carry out each correction when repeating the correction a plurality of times.

The third example of the head suspension correcting method of the present invention corrects the load and attitude angle of a head suspension by irradiating the head suspension with a laser beam such that a second irradiation history may substantially form a right angle with a first irradiation history.

The third example can minimize overlapping areas of the irradiation histories that may cause a correction error. Namely, the third example can precisely correct the load and attitude angle of a head suspension through a plurality of corrections.

A method of manufacturing a head suspension according to an embodiment of the present invention includes a process of correcting the load and attitude angle of the head suspension according to any one of the first to third examples of the head suspension correcting method of the present invention. The head suspension thus manufactured has a precisely adjusted load and attitude angle.

In addition, the head suspension thus manufactured can properly control the attitude of a magnetic head attached to the head suspension.

The method of processing a thin plate according to the present invention is based on the head suspension correcting method of the present invention. Namely, the thin plate processing method conducts a plurality of corrections on the thin plate by irradiating the thin plate with a laser beam such that a succeeding laser beam trace crosses a preceding laser beam trace. Namely, the succeeding irradiation history forms a predetermined angle with the preceding irradiation history.

The thin plate processing method can minimize overlapping areas of the irradiation histories that may cause a correction error. Namely, the method can precisely correct a thin plate through a plurality of corrections.

The present invention is not limited to the embodiments and examples mentioned above. The embodiments and examples may be modified without departing from the gist and technical idea of the present invention stipulated in the claims and specification. Head suspension correcting methods, head suspension manufacturing methods, head suspensions, and thin plate processing methods based on such modifications fall in the scope of the present invention.

For example, although the embodiments and examples of the present invention employ a standard laser marker available in the market as a laser emitting apparatus, any laser emitting apparatus is employable for the present invention if the apparatus is capable of achieving the embodiments and examples.

Although each of the above-mentioned embodiments and examples simultaneously conducts a load adjustment and an attitude angle adjustment, it is possible to conduct only one of the adjustments. In this case, a character combination to be used for the adjustment is properly selected according to a load adjustment amount or an attitude angle adjustment amount that is obtained beforehand.

A general practice of correcting an attitude angle is conducted by changing laser power. This practice of changing laser power may be combined with the present invention.

The present invention is applicable to correct a head suspension that has once been corrected and already assembled with a magnetic head into a head gimbal assembly.

The present invention is also applicable to a head suspension provided with a magnetic head for writing and reading signals. After a head suspension and a magnetic head are assembled into a head gimbal assembly, various tests are carried out. If the tests find an error in the magnetic head, the magnetic head must be replaced with another to reassemble the head gimbal assembly. In this case, the above-mentioned embodiments and examples of the present invention can correct the head gimbal assembly like the head suspension.

What is claimed is:

1. A method of correcting a head suspension by irradiating an objective part of the head suspension with a laser beam to bend the objective part with heat before or after mounting a read/write head on the head suspension, comprising the steps of:
    irradiating with the laser beam a surface of the head suspension within the objective part defined on an outrigger of the head suspension to heat the surface, thereby correcting at least one of a roll angle and a pitch angle of a surface of the head mounting part, the outrigger surrounding the head mounting part and a distal end of the outrigger constituting a distal end of the head suspension and the head mounting part and the outrigger being connected to one another only at the distal end of the head suspension and a remaining periphery of the head mounting part being spaced from the outrigger by an air gap; and
    wherein the irradiating step comprises:
    intermittently emitting the laser beam, along a first straight line of predetermined length on said surface, so that a first irradiation history is formed within said objective part by the laser beam and includes plural irradiation spots each having a center on the first straight line and so that each of the laser irradiation spots includes a region formed by a higher irradiation energy density of the laser beam than the rest of the spot and the irradiation spots are continuous and partly overlap respective adjacent irradiation spots so that the regions formed by the higher irradiation energy density in the adjacent irradiation spots do not overlap each other; and
    intermittently emitting the laser beam, along a second straight line of predetermined length on said surface, and which crosses the first straight line at a predetermined angle so that a second irradiation history is formed within the objective part by the laser beam and includes plural irradiation spots each having a center on the second straight line and so that each of the laser irradiation spots includes regions formed by higher irradiation energy density of the laser beam than the rest of the spot and are continuous and partly overlap respective adjacent irradiation spots so that regions formed by higher irradiation energy density in adjacent irradiation spots do not overlap each other, the second straight line crossing the first straight line on a same plane which is said surface at a point intermediate ends of both said straight lines and at a predetermined angle resulting in an area of overlap of the first and second irradiation histories;
    guiding the laser beam to set the overlapping area, with a correlation that the overlapping area decreasing with an increase of the crossing angle from more than 0 degrees to almost 90 degrees in one direction and the overlapping area increasing with an increase of the crossing angle from more than 90 degrees to less than 180 degrees in said one direction;
    wherein the decrease of the overlapping area with the increase of the crossing angle from more than 0 degrees to almost 90 degrees in the correlation becomes gradual starting from a first crossing angle of 30 degrees based on the interval between the adjacent irradiation spots in the irradiation histories of this time and the last time, and the increase of the overlapping area as with the increase of the crossing angle from more than 90 degrees to less than 180 degrees in the correlation is gradual to a second crossing angle of 150 degrees based on said interval between said adjacent irradiation spots; and
    wherein the crossing angle that is set based on the correlation is within a range of the correlation spanning between said first and second crossing angle, thereby correcting the head suspension with high accuracy.

2. The method of claim 1, further comprising:
intermittently emitting the laser beam along a third straight line of predetermined length which crosses the first straight line intermediate ends of the first and third straight lines so that a third irradiation history is formed which third straight line includes plural irradiation spots each having a center on the third straight line and each including a region formed by higher irradiation energy density of the laser beam than the rest of the spot and the irradiation spots are continuous and partly overlap respective adjacent irradiation spots so that regions formed by higher irradiation energy density in adjacent irradiation spots do not overlap each other and which third straight line is substantially symmetrical to the second straight line with respect to the first straight line for setting at least an overlapping area between the second and third irradiation histories.

3. The method of claim 1, further comprising:
intermittently emitting the laser beam along a third straight line of predetermined length which crosses the second straight line intermediate ends of the second and third straight lines so that a third irradiation history is formed and the second and third irradiation histories overlap to form an overlap area and which third straight line includes plural irradiation spots each including a center on the third straight line and each including a region formed by higher irradiation energy density of the laser beam than the rest of the spot and the irradiation spots are continuous and partly overlap respective adjacent irradiation spots so that regions formed by higher irradiation energy density in adjacent irradiation spots do not overlap each other and so that the third straight line forms a crossing angle with the second straight line according to a correlation for setting at least an overlapping area between the second and third irradiation histories.

4. The method of claim 1,
wherein the crossing angle is substantially forms a right angle.

5. The method of claim 2, wherein:
the first line is in a longitudinal direction of the objective part.

6. The method of claim 3, wherein:
the first line is in a longitudinal direction of the objective part.

7. The method of claim 4, wherein:
the first line is in a longitudinal direction of the objective part.

8. A method of manufacturing a head suspension, comprising:
correcting the head suspension according to the method of claim 1.

9. A head suspension manufactured according to the method of claim 8.

10. A method of correcting load and attitude angle of a thin plate of a head suspension, in which objective parts are repeatedly corrected to accurately achieve a desired correction, comprising:
irradiating a surface of said objective parts of said thin plate of the head suspension with the laser beam to bend said objective parts with heat, wherein said objective parts are defined on an outrigger of the head suspension, thereby correcting to a desired angle at least one of a roll angle and a pitch angle of a surface of the head mounting part on which the head is mounted, the outrigger surrounding the head mounting part and a distal end of the outrigger constituting a distal end of the head suspension and the head mounting part and the outrigger being connected to one another only at the distal end of the head suspension and a remaining periphery of the head mounting part being spaced from the outrigger by an air gap; and
wherein the irradiating with the laser beam a plurality of times to correct the pitch angle and/or roll angle, comprises irradiating a same surface, as follows:
emitting laser energy of a laser beam to create irradiation spots in which a central portion of each one irradiation spot has a higher irradiation energy density than a peripheral portion of said each one irradiation spot;
controlling the laser beam to form a respective sequence of said irradiation spots, each having a center on a respective one of at least three straight lines on said given objective part of the thin plate, setting a respective interval between adjacent irradiation spots of each of the sequences of irradiation spots so that each one irradiation spot of each of the sequences of irradiation spots partly overlaps each adjacent radiation spot of that sequence of irradiation spots in a manner by which the higher energy density portion of said one irradiation spot does not overlap with the higher energy portion of each adjacent irradiation spot;
controlling the laser beam and said given objective part so that each one straight line of said plurality has a respective predetermined length and a unique angle of orientation, each one straight line crossing at least two other of said straight lines that are drawn on said given objective part for achieving said desired correction to achieve two corresponding crossing points, wherein each one crossing point of the two corresponding crossing points occurs at an intermediary position between ends of said each one straight line forming said each one crossing point; and
wherein for said each one crossing point predetermining a crossing angle based on said irradiation spot interval to reduce an overlapping area of irradiation spots among said each one crossing straight line, and wherein for each one crossing point, said one crossing point occurs at a different location on each one of the straight lines forming said one crossing point to reduce overlapping area of irradiation spots from the crossing straight lines,
wherein the overlapping area increases with an increase of the crossing angle from more than 90 degrees to less than 180 degrees, and the overlapping area decreases with an increase of the crossing angle from greater than 0 to almost 90 degrees, and
wherein the decrease of the overlapping area becomes gradual starting from a first crossing angle of 30 degrees based on the interval between the adjacent irradiation spots in the irradiation histories of this time and the last time, and the increase of the overlapping area is gradual to a second crossing angle of 30 degrees based on said interval between said adjacent irradiation spots.

11. The method of claim 1, wherein said irradiating comprises irradiating the surface of the head suspension within the objective part that is at a same top or bottom side of a flexure as a surface to which the head is mounted to the head mounting part.

* * * * *